United States Patent
Root et al.

(10) Patent No.: US 8,965,270 B2
(45) Date of Patent: Feb. 24, 2015

(54) AUDIO SYSTEM WITH CENTRALIZED AUDIO SIGNAL PROCESSING

(71) Applicants: Timothy D. Root, Nashua, NH (US); Mark Desmarais, Northborough, MA (US); Holger Stoltze, Billerica, MA (US)

(72) Inventors: Timothy D. Root, Nashua, NH (US); Mark Desmarais, Northborough, MA (US); Holger Stoltze, Billerica, MA (US)

(73) Assignee: RevoLabs, Inc., Sudbury, MA (US)

( * ) Notice: Subject to any disclaimer, the term of this patent is extended or adjusted under 35 U.S.C. 154(b) by 254 days.

(21) Appl. No.: 13/693,210

(22) Filed: Dec. 4, 2012

(65) Prior Publication Data
US 2014/0154968 A1    Jun. 5, 2014

(51) Int. Cl.
*H04H 20/71* (2008.01)
*H04W 4/06* (2009.01)
*H04M 3/56* (2006.01)
*H04H 20/61* (2008.01)

(52) U.S. Cl.
CPC ................ *H04W 4/06* (2013.01); *H04M 3/568* (2013.01); *H04H 20/61* (2013.01)

USPC .......... 455/3.05; 455/41.3; 455/502; 455/561

(58) Field of Classification Search
CPC .......... H04N 7/17309; H04N 7/17318; H04W 56/00; H04W 88/08; H04W 4/06; H04B 7/2693
USPC .............. 455/3.05, 41.2, 41.3, 500, 501, 502, 455/507, 508, 517, 524, 525, 550.1, 556.1, 455/561, 562.1
See application file for complete search history.

(56) References Cited

U.S. PATENT DOCUMENTS

2013/0035064 A1* 2/2013 Balachandran et al. ....... 455/411
2014/0009564 A1* 1/2014 Cleve et al. ................ 348/14.08

\* cited by examiner

*Primary Examiner* — Nhan Le
(74) *Attorney, Agent, or Firm* — Robert Schuler (57) ABSTRACT

One or more audio conferencing systems are connected to a local network, and each conferencing system is comprised of a plurality of wireless microphones in communication with a plurality of antennas deployed in an array configuration. Each of the antennas comprising one of the audio conferencing systems is in direct communication with a base station and in indirect communication with a server which runs a centralized digital signal processing functionality. The digital signal processing functionality operates on audio information received from one or more far-end audio sources and from each of the one or more audio conferencing system.

26 Claims, 7 Drawing Sheets

FIG. 1

ROOM AUDIO SYSTEM 100 (PRIOR ART)

FIG. 2

WIRELESS/WIRED AUDIO CONFERENCING SYSTEM 200 (PRIOR ART)

AUDIO SYSTEM WITH CENTRALIZED AUDIO SIGNAL PROCESSING

FIELD OF THE INVENTION

The present disclosure relates to audio conferencing systems having wireless microphones associated with an array of antennas linked to a common network.

BACKGROUND

Meetings held in large rooms involving two or more individuals can be facilitated using a room audio system, or, in the case that individuals are conducting a remote meeting, an audio conferencing system can be used. Room audio systems or audio conferencing systems typically include some number of microphones, at least one loudspeaker and a base station which may or may not be linked to a network. In a room audio system, microphones can operate to pick up acoustic audio signals (speech) and transmit the signals to a base station which generally operates to provide session control and to process the audio signals in a number of ways before sending it to a loudspeaker located in the room to be played. Among other things, the base station can be configured to amplify audio signals, it can regulate signal gain and suppress noise, and it can remove acoustic echo from signals received by the microphones.

Figure 1:
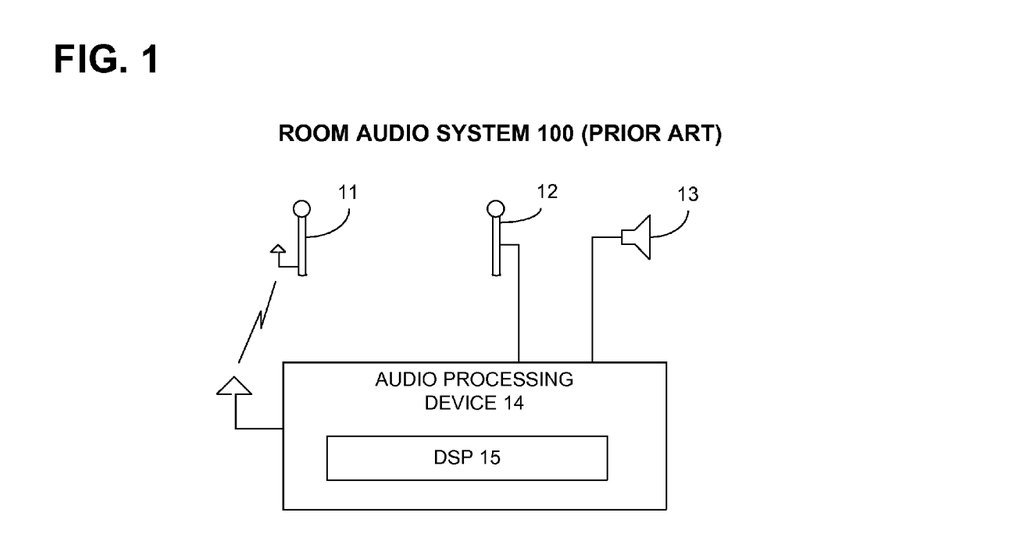
FIG. 1 is a diagram showing the functional elements of a room audio system 100.

FIG. 1 is a diagram showing functional elements comprising a commercially available room audio system 100. The system 100 can be comprised of a number of wireless microphones 11 and/or wired microphones 12, one or more loudspeakers 13, and an audio control and processing device 14. Typically, in such room audio systems, the loudspeakers 13 are wired to the device 14 and positioned within the room so that all of the individuals in the room can easily hear what each of the other individuals in the room is saying, and the processing device 14 includes complex digital signal processing and audio signal control functionality. Depending upon its capability, the processing device 14 can be a relatively expensive element of the overall system cost. Including a separate device 14 in each room in which an audio system is installed can be expensive.

Figure 2:
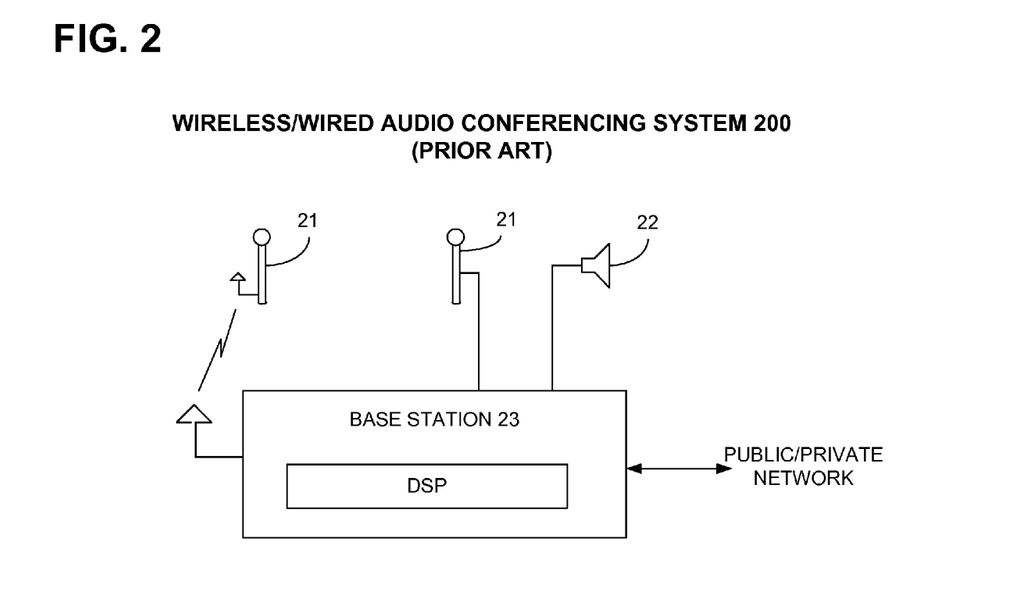
FIG. 2 is a diagram showing the functional element of an audio conferencing system 200.

A commercially available audio conferencing system 20 illustrated in FIG. 2 is comprised of some number of wired or wireless microphones 21 and loudspeakers 22 associated with an audio control and processing device 23 (such as a base station) which is in communication with one or more audio sources (can be local or remote, far end sources) over either a local or a wide area network. In addition to having audio session control functionality such as audio channel mixing, amplification and gain control, the device 23 can also have functionality for removing feedback and acoustic echo from the microphone signals. High quality audio is facilitated in such an audio conferencing system having multiple, wireless microphones attached to an individual which allows the individual to move around a room with the microphone during a conferencing session. As with conferencing system 100 described earlier with reference to FIG. 1, a separate processing device 23 is included in each room in which the system is installed and is typically the most expensive part of the system.

Figure 3:
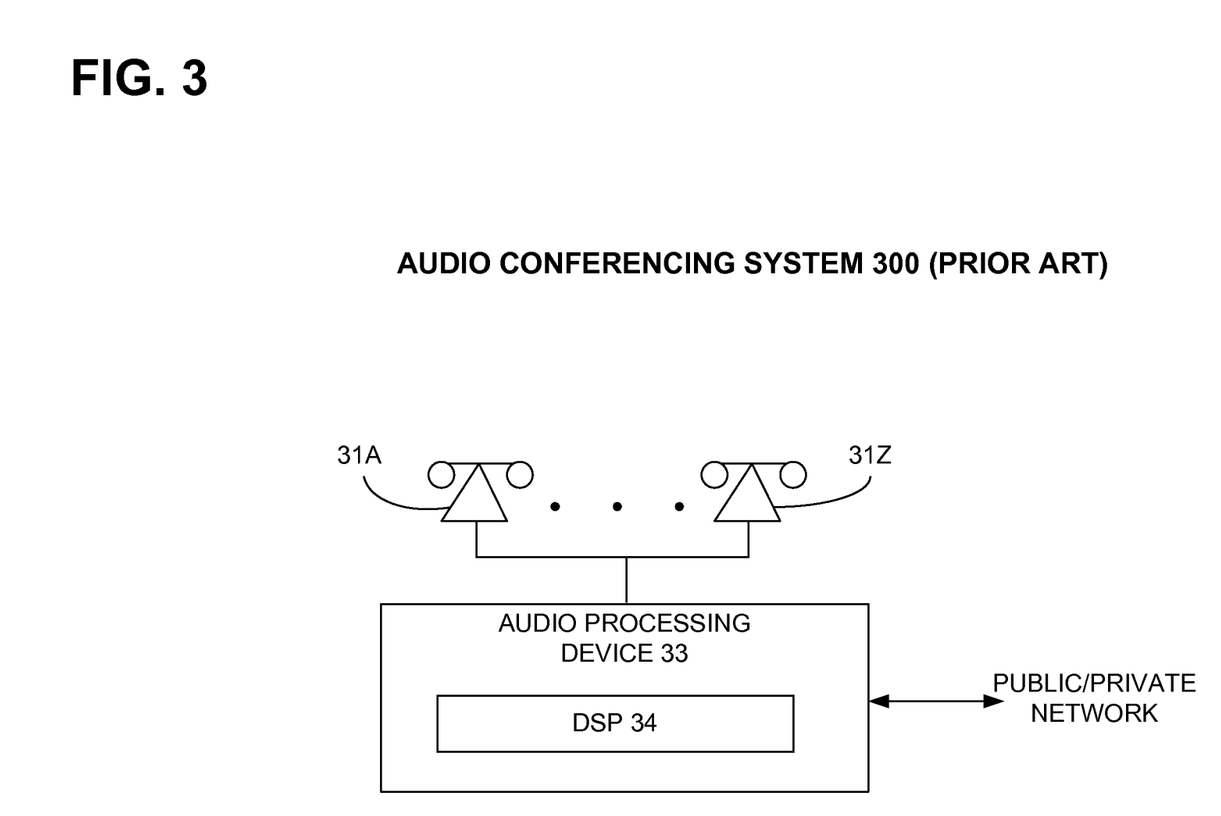
FIG. 3 is a diagram showing an audio conferencing system 300 having separate conference phones linked to an audio processing device.

Another audio conferencing system 300 configuration is shown with reference to FIG. 3 in which each of a plurality of separate conference phones (31A-31Z) have an integrated microphone, loudspeaker, control and handset. Each of the phones are shown to be connected over a local network 32 to a common audio processing device 33. In this configuration, all of the audio signal processing is performed by a digital signal processor (DSP) 34 comprising the device 33. In order for a system in this configuration to perform acoustic echo cancellation (AEC), it is necessary that the timing of an audio sampling function at each of the phones and at the DSP 34 be tightly correlated or synchronized. Having the signal processing functionality located in a single, network device as opposed to including this functionality in each of the conference phone simplifies the operation and lowers the cost of each phone. While the system 300 in FIG. 3 is reasonably priced, it is not well suited for a large meeting room or conference room application in which there are many individuals spread out in the room or in which the individuals are moving around the room.

BRIEF DESCRIPTION OF THE DRAWINGS

The present invention can be best understood by reading the specification with reference to the following figures, in which.

DETAILED DESCRIPTION

Cross Reference to Related Applications: This application claims the benefit under 35 U.S.C. 120 of U.S. patent application Ser. No. 13/541,148 entitled, "Synchronizing Audio Signal Sampling in a Wireless Digital Audio Conferencing System", filed Jul. 3, 2012, the entire contents of which are incorporated herein by reference.

Typically, a room audio system or audio conferencing system using wireless microphones has a single base station positioned in a room with the microphones to receive signals from and send signals to each of the microphones. The base station can include a transceiver or radio designed to operate according to a particular wireless protocol such as WiFi or DECT and it can have audio control and audio signal processing functionality. A room audio system is generally self contained and not linked to a network while an audio conferencing system is typically linked to either a local network such as an Ethernet, or it is linked to a wide area network such as the Internet.

While configuring each system with a base station proximate to the wireless microphones simplifies audio signal processing, it adds unnecessarily to the overall cost of the system, and restricts the systems use to the room in which the system is installed. It was discovered, according to one embodiment, that it is possible to design and deploy a low cost, flexible/mobile/transportable room audio or audio conferencing system having a single, central audio processing device (DSP) which is in communication with two or more antenna groups, each antenna group being geographically separated from each other antenna group, and each antenna group having at least two antennas. One or more wireless microphones can be associated with each antenna in an antenna group, and each antenna can be wirelessly linked to the centralized audio processing device (i.e, base station) so that one or more antenna in an antenna group can be easily transported between meeting rooms that are within range of the central audio processing device.

According to another embodiment, a single, central audio processing device is connected to two or more base stations, and each base station is connected to two or more geographically separated antenna groups, with each antenna group having at least two antennas. In order to cancel echo from an acoustic audio signal received at any of the microphones, the timing of audio sampling functionality at the microphones and audio sampling functionality at the centralized audio processing device is tightly synchronized to facilitate the operation of the digital signal processing functionality.

According to each embodiment of the invention described above, the two or more geographically separated antenna groups comprise a single antenna array that is connected, either wirelessly or is wired to, a single base station. Depending upon the manner in which the antenna array is physically configured, each of the wireless microphones associated with an antenna in an antenna group in the antenna array can roam from one antenna to another antenna, and roam from one antenna group to another antenna group without interrupting an audio signal to or from a microphone.

Figure 4:
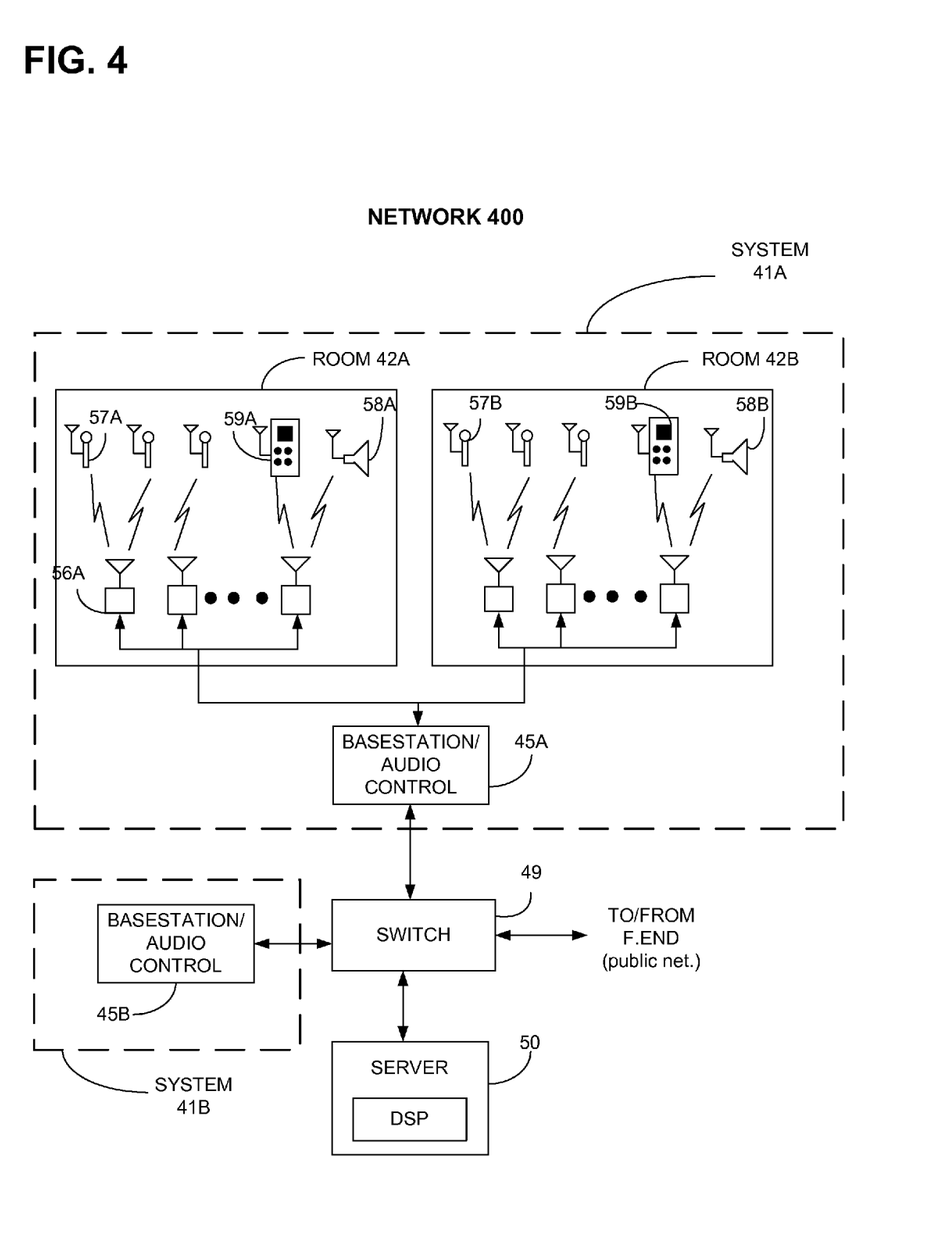
FIG. 4 is a diagram of an embodiment of an audio conferencing system 400 with a centralized audio processor and an array of antenna/transceiver devices.

A local network 400 shown in FIG. 4 is comprised of at least one network switch 49, a computational device such as a server 50, and one or more audio systems 41A and 41B. According to this description, the audio system 41A and 41B can be a room audio system or an audio conferencing system that is connected to a public network, such as the Internet. Each audio system 41A and 41B utilizes a central digital signal processing function running on the server 50 to perform acoustic echo cancellation on an audio signal received at any of a plurality of microphones 57 comprising each of the audio systems 41A and 41B. Each audio system 41A and 41B in FIG. 4 comprises a single base station 45A and 45B respectively, a plurality of antenna/receiver devices 56A and 56B, a plurality of wireless microphones 57A and 57B, one or more associated loudspeakers (either wired or wireless) 58A and 58B, and an optional wireless control module 59A and 59B respectively. Each of the microphones 57A and 57B, antennas 56A and 56B, loudspeakers 58A and 58B, and the optional control module 59A, are shown installed in two separate rooms 42A and 42B respectively. The antennas 57A installed in room 42A are referred to as an antenna group, with a different antenna group installed in each room 42A and 42B. Together, the antenna groups in rooms 42A and 42B comprise an antenna array, and the antenna array is connected to a single base station 45A in FIG. 4. The base station is in this case connected to the network switch 49 which is, in turn connected to a public network 60. The switch 49 is, in this case, connected to two audio systems 41A and 41B and to the server 50. The server 50 has digital signal processing functionality that is specially designed to cancel acoustic echo in audio signals received at any of the microphones 57B and 57B.

Referring to FIG. 4 in more detail, room 42A has one or more antennas 56A each of which is associated with one or more of the wireless microphones 57A, at least one of the loudspeakers (wired or wireless) 58A, and the optional wireless control device 59A. Each room 42A and 42B in the audio system 41A can have a similar number and types of system components or they can have a different number and types of system components. Each room can have the same number of antennas or not, each room can have the same number of microphones or not, each room can have the same number of loudspeakers or not, and each room can have a system control device or not. The similarity and differences between the component parts comprising an audio system in each room typically depends upon the size of the room, the number of individuals using the system, and any user specified requirements, such as an individual's mobility.

Continuing to refer to FIG. 4, depending upon the audio conferencing system components installed in each room, each of the base stations 45A and 45B supporting the audio systems 41A and 41B respectively can have similar or different audio control functionality, but generally each base station can have functionality to control the mixing of two or more audio channels and to control the gain of each audio channel. The switch 49 generally operates to receive frames of audio and other information from the base stations 45A and 45B, from the server 50, and to receive packets comprising audio and other information from a far-end audio source and forwarding this information to a destination within network 400. The server 50 is comprised of, among other things, digital signal processing functionality, described later with reference to FIG. 6, that can operate to cancel acoustic echo from samples of audio information captured by any of the microphones 57A and 57B associated with the each audio system. In order for either of the audio systems 41A or 41B to operate to cancel acoustic echo from each of the microphone signals, it is necessary to synchronize the timing of the audio sampling functions running on all of the wireless microphones and running in association with the digital signal processing (DSP) on the server 50. Synchronization in the context of this description relates to the audio system time at which samples of audio information are captured at a microphone and at a base station such that substantially the same audio information is captured in both samples, albeit the sample captured at the microphone represents audio information in a format that is transmitted over a wireless medium, while the sample captured at the base station represents audio information in a format that is transmitted over a wired medium. Finally, the control module 59 is an optional element that can be employed by audio system users to among other things initiate and terminate conferencing sessions, to mute near-end audio, and to control loudspeaker gain.

In order to effect the audio system timing synchronization described above, it is necessary for each microphone, each antenna, each base station, the switch and the server comprising the network 400 in FIG. 4 to implement a timing synchronization protocol. The same protocol can be implemented in each device comprising the audio system, or more than one protocol can be strategically implemented. One such timing synchronization protocol is described in two IEEE standards documents, the first one of which is entitled "Local and Metropolitan Area Networks—Audio Video Bridging (AVB) Systems" (IEEE Std 802.1BA-2011) and published in 30 Sep. 2011, and the second one of which is an Internet-Draft standard entitled "Synchronization for RTP Streams draft-Williams-avtext-avbsync-01 (IEEE 1588/802.1AS). Both of these IEEE documents are publically available and the entire contents of these documents are incorporated herein by reference. Another timing protocol is described in the earlier referenced U.S. patent application.

Continuing to refer to FIG. 4, and in another embodiment, each of the audio systems 41A and 41B described with reference to FIG. 4 may not include the base stations 45A and 45B respectively. In this configuration, the switch 49 operates to forward packets/frames of audio information to the appropriate destination antenna group located in each of the different rooms and to receive audio information from each of the antenna groups in the different rooms. Further, the functionality comprising the base stations can be implemented in the digital signal processing functionality associated with the server 50, for example. The general operation of the audio conferencing system 41A of FIG. 4 to support an audio session is described below.

In operation, the network switch 49 in FIG. 4 receives packets of audio information transmitted to it by a far-end audio source, such as another audio system. The switch 49 can forward the audio information comprising the packets to the server 50 where digital signal processing functionality can capture a first sample of audio information and store this first sample for later use. The server 50 can then send the audio information back to the switch 49 which can in turn forward the audio information to the base station 45A. The base station 45A can then adjust the gain and/or mix the audio information with other audio information and send this mixed audio information to a loudspeaker, such as loudspeaker 58A in room R42A, to be played. One or some of the wireless microphones 57A in room 42A can receive acoustic audio information played by the loudspeaker, and it can receive acoustic audio information from another audio source in the room, such as from one or more individuals speaking in the room. The acoustic audio information received by the microphone is captured in a second sample of audio information and sent to the server 50 for processing. The DSP functionality running on the server then uses the audio information comprising the first sample to remove acoustic echo in the second sample of audio information, and the server can send the audio information with the echo removed back to the switch for transmission to the far-end.

In an alternative embodiment the digital signal processing functionality running on the server 50 can be located in each of the base stations, but otherwise the configuration and operation of the conferencing systems in FIG. 4 is the same. A more detailed description of the component parts of the audio conferencing system 41A of FIG. 4 is undertaken below with reference to FIG. 5 and FIG. 6.

The audio conferencing systems 41A and 41B described earlier with reference to FIG. 4 each comprise a plurality of antennas 56B and 56W which are deployed in association with each audio system in one or more geographically separate locations. According to this embodiment, geographically separate locations can be construed to mean that a plurality of antennas (an antenna group) are deployed in one room but separated from each other spatially, that a plurality of antennas are deployed in each of two or more different rooms, or that a plurality of antennas are deployed in each of two or more different buildings. The antenna deployment arrangement associated with each audio system is referred to here as an antenna array. Unless an audio system is installed in only one room, each separate location in which a group of antennas is installed comprises a portion of the antenna array, and each portion (group) can include one or more antennas. Such an antenna array 500 is now described below with reference to FIG. 5.

Figure 5:
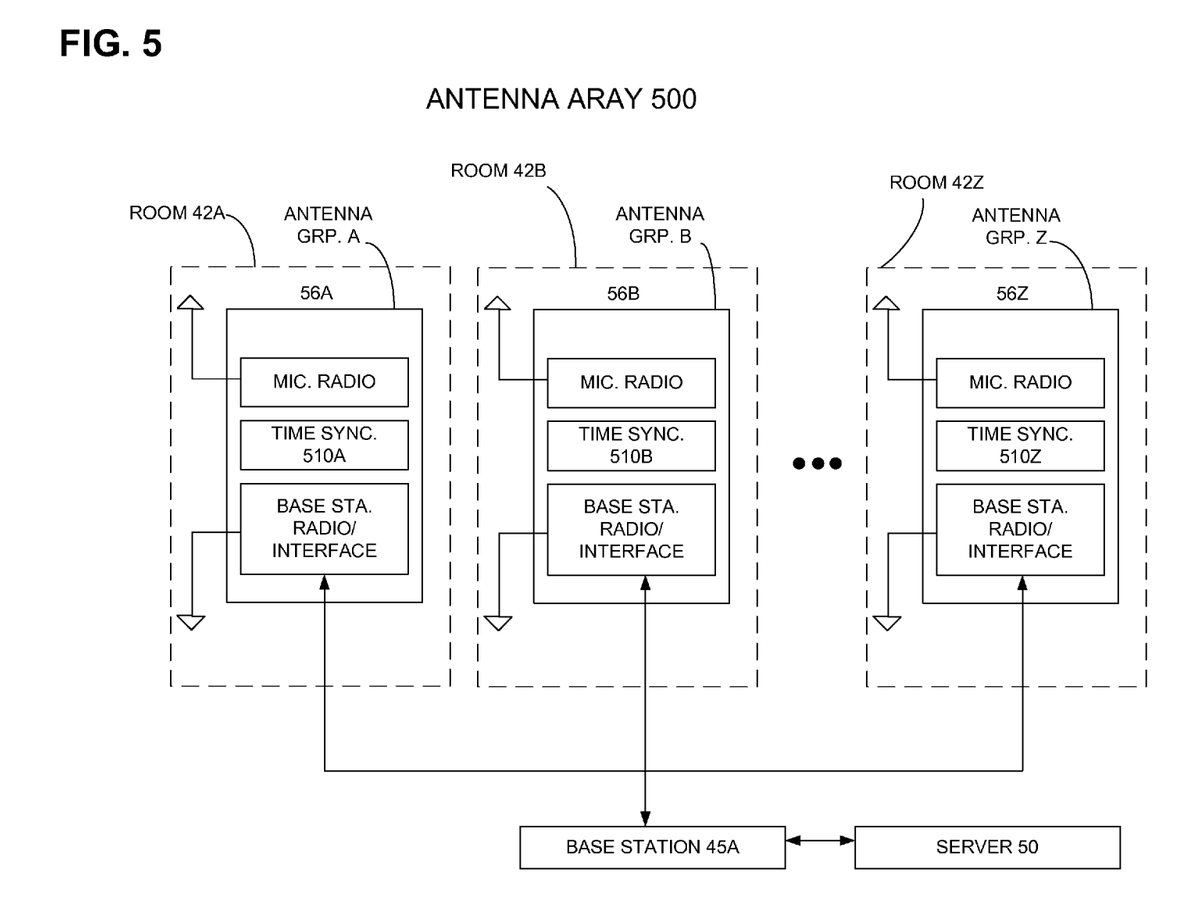
FIG. 5 is a diagram showing functionality comprising an antenna array 500.

As described above, each antenna array is comprised of two or more antennas deployed in antenna groups at one or more geographic locations. Each antenna in the array can be connected to a base station, such as the base station 45A of FIG. 4, over either a wired or wireless network link, and each antenna in the array can be connected to one or more wireless microphones (not shown) over a wireless link. FIG. 5 shows a plurality of antenna groups 56A, 56B to 56Z each group deployed in one of a plurality of locations or rooms 42A to 42Z respectively. The distribution between wireless and wired network links can vary from location to location in the antenna array depending upon the application for which the audio system is used. One location can have antennas that are all connected to a base station over a wireless link, have antennas connected to the base station over wired links, or have some combination of antennas with wired and wireless links to the base station.

Continuing to refer to FIG. 5, each antenna 56A has a transceiver (mic. radio) for communicating with one or more microphones, and each antenna has an interface for communicating with the base station 45A. Each mic. radio can be designed to support the transmission or reception of two or more channels of audio information in a time division multiplexed manner. Each channel can be dedicated to communication with a particular one of a plurality of microphones 57A in FIG. 4. Antennas connected to the base station 45A over a wireless link, such as antenna one of the antennas 56A, has a wireless transceiver such as an 802.11 radio, whereas antennas connected to the base station 45A over a wired link have a wired interface such as an Ethernet interface card (NIC). As described earlier, all of the antennas comprising the audio system 41A have a transceiver in order to communicate with a wireless microphone, and this transceiver can be a digital radio (DECT, WiFi or other wireless technology) or it can be an analog radio. Regardless of the means they employ to communicate with a base station, each of the antennas can run a time synchronization protocol 510 such as that referred to earlier in the two IEEE publications. Generally, the time synchronization protocol is implemented in each device in the network 400 of FIG. 4 along a path between a microphone and a device having the DSP. This time synchronization protocol generally operates to detect/compute signal delay over links (wired or wireless) between an antenna on which the protocol is running and an associated wireless microphone and base station. Specifically, the time synchronization protocol operates to calculate a signal propagation delay over a link (such as a link between a base station and an antenna) and it operates to calculate a signal residence time delay (which is the time that it takes a signal to pass through an antenna).

Figure 6:
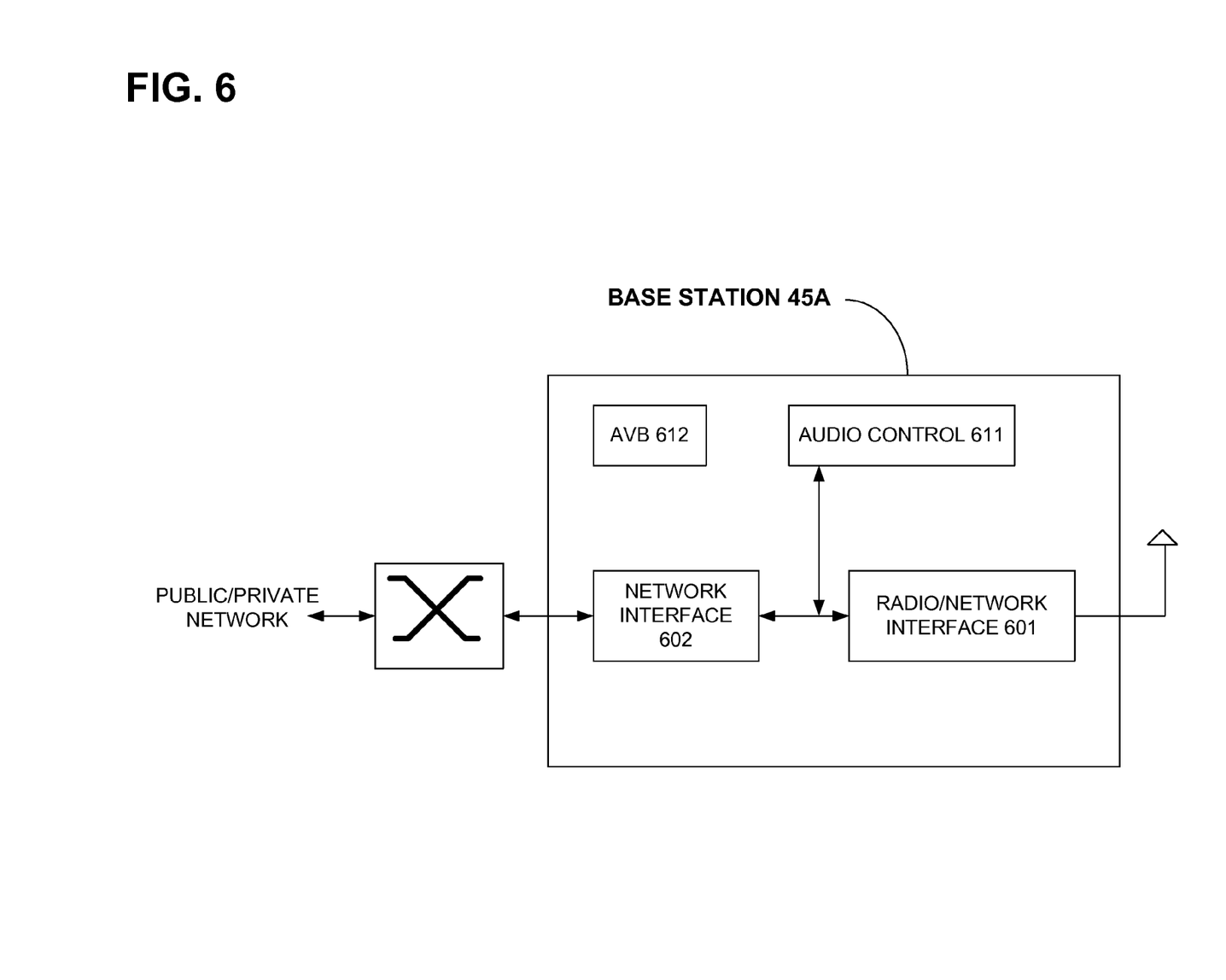
FIG. 6 is a diagram showing functionality comprising a base station 45A.

FIG. 6 is a block diagram illustrating the functional elements comprising a base station such as the base station 45A of FIG. 4. The base station 45A has either a radio (digital or analog) or a physical network interface device 601 for communicating with each antenna in an antenna array, such as the array 500, and it has a physical network interface 602 connected over to a link 605 to the network switch 49 of FIG. 4. The base station 45A can also have audio signal control functionality 611 and means for running a time synchronization protocol functionality 612. These means can be a special or general purpose computational device operating in conjunction with a non-volatile memory device or the means can be either of the two interface devices 601 and 602. Regardless, the time synchronization protocol functionality 612 can operate in a manner similar to, and be the same as or compatible with, the time synchronization functionality 510 described earlier with reference to FIG. 5. The base station 45A generally operates to receive one or more channels of audio information over the link 605 at the network interface 602, use the audio control function(s) 611 to mix two or more of the channels of audio information and to regulate the gain in each channel, and use the radio 601 to transmit/send the audio signal to an antenna. Depending upon the number of audio systems comprising the network 400 of FIG. 4, the base station 45A can be connected over the network link 605 directly to a network switch, such as the switch 49 in FIG. 4, which variously operates to forward audio information to an audio system or to receive audio information from an audio system, or the base station 45A can be connected directly to a server (in the case that a network includes only one conferencing system), such as the server 50 in FIG. 4, running acoustic echo cancellation functionality. The operation of the network switch 49 is not described here in any detail other than mentioning that it does implement the time synchronization functionality described earlier with reference to the antenna(s) in FIG. 5.

Figure 7:
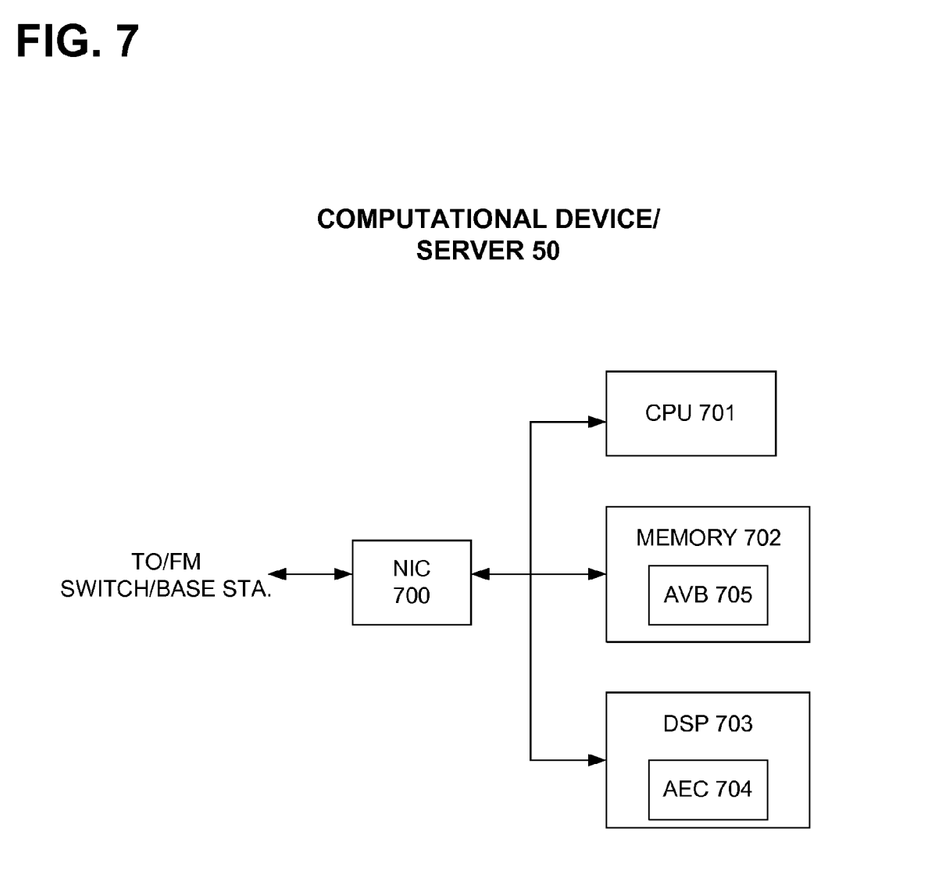
FIG. 7 is a diagram showing functionality comprising a server 50.

Functional elements comprising the server 50 are now discussed in more detail with reference to FIG. 7. The server 50 is connected to the network 400, via a NIC 700, such that it can receive audio information from a far-end audio source and such that it is addressable by any of the audio systems comprising the network. As previously described, although acoustic echo cancellation (AEC) functionality is described herein as running in a network server, the AEC functionality can be implemented on any suitable computational device which can be configured to operate in a network environment and which can be configured with a digital signal processing device on which the AEC functionality can run. Accordingly, the server 50 is comprised of a central processing unit (CPU) 701, a non-volatile/non-transitory memory device 702, one or more digital signal processors 703 and associated AEC functionality 704, and timing synchronization protocol functionality 705 stored in memory 702. Depending upon the number of audio systems comprising the network 400, the complexity of each of the audio systems and the capability of a DSP, one or more than one DSPs 703 may be necessary the systems echo cancellation requirements. Regardless, each DSP 703 has AEC functionality 704 that generally operates to receive, sample and store far-end audio information, to receive samples of audio information from each microphone, and to remove the component of the audio information received from the microphones that constitutes acoustic echo (which is equivalent to an estimate of the sampled far-end audio information played over a loudspeaker). The time synchronization protocol functionality 705 can comprise software code which is stored in memory 702 where it can be operated on by the CPU 701. The process by which acoustic echo is removed from a near-end microphone signal is not described here in any detail, as AEC processes are well known to those skilled in the art.

Prior art audio conferencing systems are design such that the AEC functionality is as close to the system microphones as practical (typically in the same room). Proximity of the AEC functionality to the microphones simplifies the methods employed to remove acoustic echo from the microphone signals. Specifically, in order to effectively cancel acoustic echo from audio samples captured at a microphone, it is essential that the system is able to synchronize/correlate the time at which the AEC functionality 704 in server 50 samples a far-end audio signal with the sampling time of an acoustic signal at any of the microphones 57A for instance. Without this correlation in time between the two sampling functions, it is not possible to remove an acoustic echo component from a microphone signal. The farther the AEC functionality is moved away from the microphones in an audio system, the more difficult it becomes to correlate the timing of the two sampling functions. In order to overcome this problem, the time synchronization functionality described earlier can be employed to very accurately provide the sample time correlation information necessary to run an AEC function that is positioned in a centralized network location, remotely from the microphones comprising an audio system.

The functional elements comprising the time synchronization protocol implemented on the various devices in the network 400 are described with reference to a published IEEE document entitled "802.1AS Tutorial" dated 2008, Nov. 13 and authored by Kevin B. Stanton. This IEEE document describes in detail how to implement the time synchronization protocol and so it will not be described here in any detail. However, the signal delays that should be calculated when implementing the conferencing system 400 described with reference to FIG. 4 is described below with reference to FIG. 8.

Figure 8:
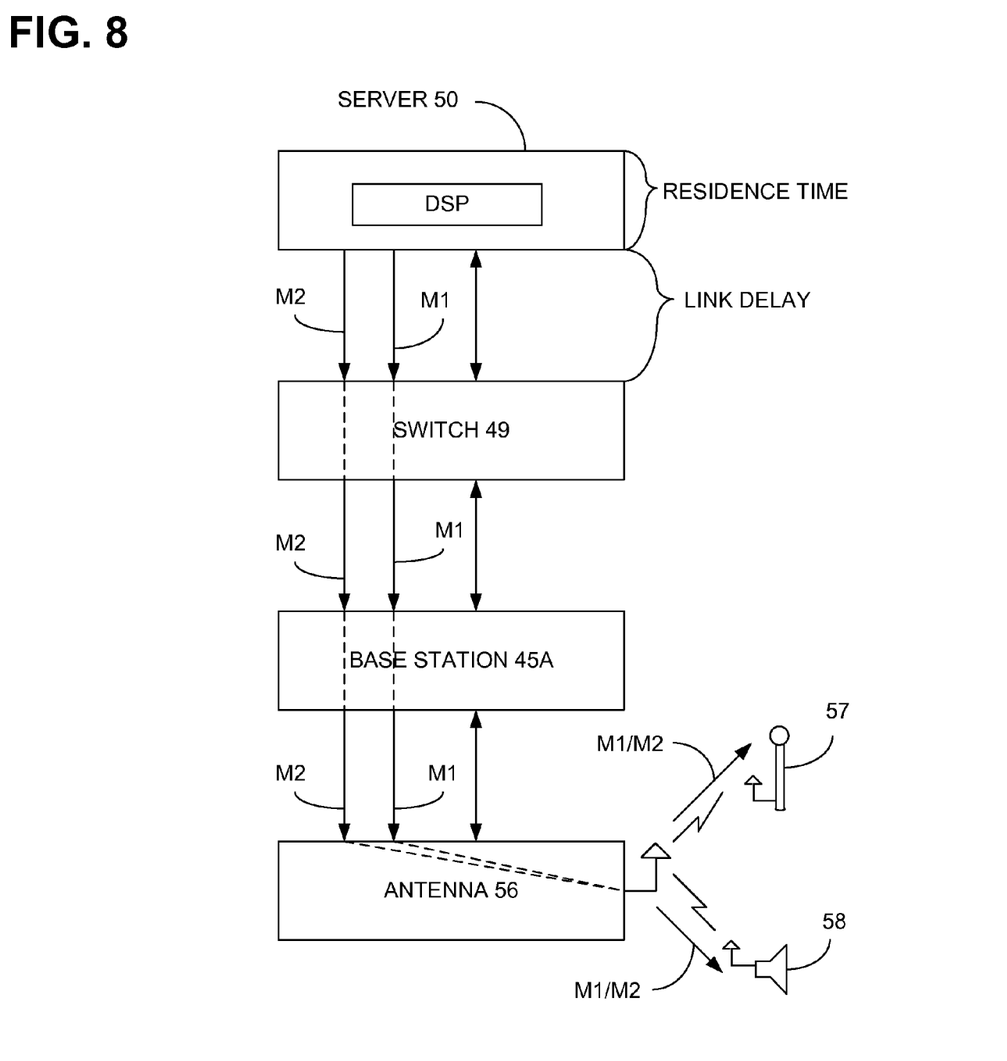
FIG. 8 is a diagram showing modules comprising a time synchronization function 800.

FIG. 8 is an illustration of the functional elements/devices comprising network 400 that can be Included in the audio conferencing system 41A of FIG. 4. As previously described, in order to remove acoustic echo from a microphone signal, it is necessary to correlate the sample times of both a far-end audio signal received by the system 41A and the sample time of an acoustic signal received at a microphone. In order to correlate the time of the samples, it is necessary to calculate (using the time synchronization protocol) all of the delays in the signal path between the server 50 (running the DSP which implements the AEC) and the wireless microphones 57A for instance. Specifically, it is necessary to calculate all of the delays in the network signal path from the location at which the far-end audio signal is sampled, which is the DSP in this case, to the location at which an acoustic signal corresponding to the far-end audio signal played by the loudspeaker 58A is sampled, which is one of the wireless microphones 57A in this case. This path signal delay calculation is made as follows.

After the network selects a master clock to which at least some of the network device timing can be synchronized, the network device in which the master clock is running can generate a first and a second master timing frame that is propagated to the devices connected (wirelessly or wired) to the network, which can be network 400 in this case. The first and the second master timing frames can include, among other things, a time stamp corresponding to the time (T1) at which the frame is transmitted by the network device, which in this case can be the server 50 of FIG. 4, and the master timing frames can be transmitted periodically according to a time interval selected by a network administrator for instance. For the purposes of this description, it is assumed that one network path between the server 50 and a microphone 57A is the path that traverses the server 50, the switch 49, the base station 45A, an antenna 56, a loudspeaker 58A and/or a microphone 57A. Each instance of a time synchronization function located at each network device along the path uses the time stamp information included in the first master timing frame to calculate a link delay and a residence time. These times are temporarily stored by the network devices at least until the second master timing frame is received by the network device. The second master timing frame incorporates the delay and residence time calculated at each network device in the path into one or more fields comprising the timing frame as delay and resident time information, and when the timing frame reaches its destination, which in this case is the microphone 57A, all of the delays and residence times can be summed by the timing synchronization protocol running on the microphones which results in a time T1 plus a total network signal path delay time value (PathDelayTotal). The value of the PathDelayTotal can be used by the microphone audio sampling functionality to correlate samples of audio information captured at the microphone with audio information sampled at the DSP running in the server 50.

Returning to FIG. 8, two master timing messages M1 and M2 are transmitted by the server 50 and propagate over the network path starting at the server 50, through the switch 49, the base station 45A, an antenna 56A, to the loudspeaker 58A and/or the wireless microphone 57A. As previously described, the message M1 comprises time stamp information relating to the time the message is transmitted by the server 50. This time stamp information is inserted into the message by a server output port. Each of the time synchronization functions located in the network devices in the path use the time stamp information in the message M1 in order to calculate link delay between devices, and the same time synchronization functionality is used to measure the residence time for the time frame in the network device. The second master timing message M2 is transmitted a selected time subsequent to the first master timing message M1, and this message is operated on by the timing synchronization function in each network device in the path to place the link delays and the residence time into fields comprising the message M2. When the message M2 arrives at its destination, which in this case is the wireless microphone 57A, all of the link delay and residence time information is included in one or more fields comprising the message and as described above is used to determine the total signal delay between the server and the microphone.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A wireless audio system, comprising:
   a plurality of geographically distributed wireless microphone groups each group having at least one wireless microphone and being associated with at least one of a plurality of loudspeakers;
   at least one antenna comprising each of a plurality of geographically distributed antenna groups, the plurality of the geographically distributed antenna groups comprising an antenna array, and each one of the antenna groups in communication with one of the wireless microphone groups;
   a base station in communication with each one of the plurality of the geographically distributed antenna groups, the base station having digital signal processing functionality ; and
   each of the wireless microphones comprising each of the plurality of geographically distributed wireless microphone groups, each of the antennas comprising each of the plurality of geographically distributed antenna groups, and the base station operate to run a time synchronization protocol that correlates the time at which the base station captures a first sample of audio information and the time at which one of the microphones captures a second sample of audio information;
   wherein the first and second samples of audio information are used by the digital signal processing functionality to remove substantially all of the acoustic echo associated with the second sample of audio information.

2. The system of claim 1, wherein the first and second samples of audio information are substantially the same.

3. The system of claim 2, wherein the first sample of audio information comprises information captured from the audio signal transmitted over a wired medium and the second sample of audio information comprises information captured from the audio signal transmitted over a wireless medium.

4. The system of claim 3, wherein the second sample of audio information comprises an acoustic echo component that is cancelled by the digital signal processing functionality at the base station.

5. The system of claim 1, further comprising a device for wirelessly controlling the operation of the audio system.

6. The system of claim 1, further comprising any one of the wireless microphones roaming from one of the plurality of the geographically distributed wireless microphone groups to another one of the plurality of the geographically distributed wireless microphone groups.

7. The system of claim 1, wherein each of the antennas have at least one receiver device for receiving signals having audio information from one of the wireless microphones.

8. The system of claim 1, wherein each wireless microphone is associated with one of an audio signal reproduction device (earphone).

9. The system of claim 1, wherein the digital signal processing functionality operates to cancel acoustic echo in the second sample of audio information received from any one of the wireless microphones.

10. A wireless audio system, comprising:
    two or more sets of a plurality of geographically distributed wireless microphone groups, each of the wireless microphone groups having at least one wireless microphone and each of the wireless microphone groups being associated with at least one of a plurality of loudspeakers;
    two or more antenna arrays each comprising one set of the plurality of geographically distributed antenna groups, each one of the antenna groups having at least one antenna which is in communication with one of the plurality of geographically distributed wireless microphone groups; and
    a digital signal processor located remotely from and in communication with each one of the two or more antenna arrays, the digital signal processor having functionality that operates to remove acoustic echo from audio signals received from each of the two or more antenna arrays.

11. The system of claim 10, further comprising the wireless audio system having functionality that operates to run a time synchronization protocol that correlates the time at which the digital signal processing functionality captures a first sample of audio information and the time at which one of the microphones captures a second sample of audio information.

12. The system of claim 10, wherein the first and second samples of audio information are substantially the same.

13. The system of claim 11, wherein the first sample of audio information comprises information captured from the audio signal transmitted over a wired medium and the second sample of audio information comprises information captured from the audio signal transmitted over a wireless medium.

14. The system of claim 13, wherein the second sample of audio information comprises an acoustic echo component that is cancelled by the digital signal processing functionality at the base station.

15. The system of claim 10, further comprising a device for wireles sly controlling the operation of the audio system.

16. The system of claim 10, wherein each of the antennas have at least one receiver device for receiving signals having audio information from one of the wireless microphones.

17. The system of claim 10, wherein each wireless microphone is associated with one of an audio signal reproduction device.

18. The system of claim 10, wherein the digital signal processing functionality operates to cancel acoustic echo in the second sample of audio information received from any one of the wireless microphones.

19. The system of claim 10, further comprising each of the two or more base stations are in communication with a far-end audio system over a public network.

20. A method of processing an audio signal in a wireless audio system, comprising:
    capturing, at a digital signal processor, a first sample of audio information from the audio signal at a first system time, and transmitting the audio signal to at least one of two or more of an antenna array, each antenna array having a plurality of geographically distributed antenna groups and each antenna group having at least one antenna, the digital signal processor being located remotely from the two or more antenna arrays;
    transmitting the audio signal from the at least one of the two or more of the antenna arrays to a loudspeaker associated with at least one of the antenna groups, and the loudspeaker playing the audio signal;
    receiving and capturing, at a wireless microphone associated with the at least one of the antenna groups, at a second system time a second sample of audio information in an acoustic audio signal that substantially corresponds to audio information captured from the audio signal in the first sample of audio information at the first system time, and sending the second sample of audio information to the digital signal processor, and
    using audio information derived from the first sample of audio information captured at the first system time to cancel substantially all of the audio information comprising the second sample of audio information captured at the second system time.

21. The method of claim 20, further comprising the wireless audio system running a time synchronization protocol that correlates the time at which the digital signal processor captures a first sample of audio information and the time at which one of the wireless microphones captures a second sample of audio information.

22. The method of claim 20, wherein the digital signal processor comprises a computational device that is in communication with each of the two or more of the antenna arrays.

23. The method of claim 22, further comprising the digital signal processor being in communication with a public or a private network.

24. The method of claim 20, wherein the audio signal is received by the wireless audio system from a public network or the audio signal is generated by an audio source and captured by the wireless audio system.

25. The method of claim 20, wherein the first sample of audio information comprises information captured from the audio signal transmitted over a wired medium and the second sample of audio information comprises information captured from the audio signal transmitted over a wireless medium.

26. The method of claim 20, wherein the audio information that is cancelled is audio information associated with acoustic echo.

\* \* \* \* \*